(12) United States Patent
King et al.

(10) Patent No.: US 11,934,257 B2
(45) Date of Patent: Mar. 19, 2024

(54) PROCESSING TASKS IN A PROCESSING SYSTEM

(71) Applicant: Imagination Technologies Limited, Kings Langley (GB)

(72) Inventors: Ian King, Hertfordshire (GB); Donald Scorgie, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/548,043

(22) Filed: Dec. 10, 2021

(65) Prior Publication Data

US 2022/0253348 A1    Aug. 11, 2022

(30) Foreign Application Priority Data

Dec. 10, 2020  (GB) ........................... 2019527
Jun. 29, 2021  (GB) ........................... 2109357

(51) Int. Cl.
*G06F 11/00*   (2006.01)
*G06F 9/50*    (2006.01)
*G06F 11/07*   (2006.01)
*G06F 12/02*   (2006.01)

(52) U.S. Cl.
CPC .......... *G06F 11/079* (2013.01); *G06F 9/5038* (2013.01); *G06F 11/073* (2013.01); *G06F 12/023* (2013.01); *G06F 2212/1041* (2013.01)

(58) Field of Classification Search
CPC .... G06F 11/079; G06F 11/073; G06F 12/023; G06F 2212/1041
USPC ............................................. 714/1–57
See application file for complete search history.

(56) References Cited

U.S. PATENT DOCUMENTS

| | | | |
|---|---|---|---|
| 9,053,107 B1* | 6/2015 | Le .......................... | G06F 16/178 |
| 2005/0015663 A1* | 1/2005 | Armangau .......... | G06F 11/2082 714/E11.107 |
| 2008/0133975 A1 | 6/2008 | Pfeiffer et al. | |
| 2009/0031310 A1* | 1/2009 | Lev .......................... | G06F 9/466 718/101 |
| 2009/0094589 A1* | 4/2009 | Gupta ................. | G06F 11/3612 717/154 |
| 2011/0145358 A1 | 6/2011 | Erez et al. | |

(Continued)

FOREIGN PATENT DOCUMENTS

| | | |
|---|---|---|
| EP | 3663921 A1 | 6/2020 |
| JP | H07168731 A | 7/1995 |

(Continued)

*Primary Examiner* — Sarai E Butler
(74) *Attorney, Agent, or Firm* — Potomac Law Group, PLLC; Vincent M DeLuca

(57) ABSTRACT

A method of processing an input task in a processing system involves duplicating the input task so as to form a first task and a second task; allocating memory including a first block of memory configured to store read-write data to be accessed during the processing of the first task; a second block of memory configured to store a copy of the read-write data to be accessed during the processing of the second task; and a third block of memory configured to store read-only data to be accessed during the processing of both the first task and the second task; and processing the first task and the second task at processing logic of the processing system so as to, respectively, generate first and second outputs.

21 Claims, 6 Drawing Sheets

(56) References Cited

U.S. PATENT DOCUMENTS

| | | | | |
|---|---|---|---|---|
| 2013/0198571 A1* | 8/2013 | Brewerton | ........... | G06F 11/1645 |
| | | | | 714/37 |
| 2013/0268807 A1* | 10/2013 | Spencer | ............. | G06F 11/1415 |
| | | | | 714/18 |
| 2014/0181581 A1* | 6/2014 | Flautner | .................. | G06F 11/00 |
| | | | | 714/15 |
| 2015/0039934 A1* | 2/2015 | Resch | ...................... | G06F 3/064 |
| | | | | 714/6.22 |
| 2015/0227414 A1* | 8/2015 | Varma | ................ | G06F 11/0793 |
| | | | | 714/47.1 |
| 2015/0234719 A1* | 8/2015 | Coronado | ............. | G06F 11/203 |
| | | | | 714/6.3 |
| 2015/0269018 A1* | 9/2015 | Ellis | .................... | G06F 11/2635 |
| | | | | 714/42 |
| 2016/0055047 A1 | 2/2016 | Okamoto | | |
| 2016/0092285 A1* | 3/2016 | Hartono | ................ | G06F 9/4552 |
| | | | | 714/6.2 |
| 2016/0154710 A1* | 6/2016 | Wade | .................. | G06F 11/1438 |
| | | | | 714/19 |
| 2016/0170828 A1* | 6/2016 | Carlough | ............. | G06F 9/3867 |
| | | | | 714/49 |
| 2020/0117509 A1 | 4/2020 | Christian et al. | | |
| 2020/0174897 A1 | 6/2020 | Mcnamara et al. | | |

FOREIGN PATENT DOCUMENTS

| | | |
|---|---|---|
| JP | 20080513899 | 5/2008 |
| JP | 2012168605 A | 9/2012 |
| JP | 2020091868 A | 6/2020 |
| WO | 2006032585 A1 | 3/2006 |

* cited by examiner

PROCESSING TASKS IN A PROCESSING SYSTEM

BACKGROUND

The present disclosure relates to processing systems and methods of processing tasks in processing systems.

In safety-critical systems, at least some of the components of the system must meet safety goals sufficient to enable the system as a whole to meet a level of safety deemed necessary for the system. For example, in most jurisdictions, seat belt retractors in vehicles must meet specific safety standards in order for a vehicle provided with such devices to pass safety tests. Likewise, vehicle tyres must meet specific standards in order for a vehicle equipped with such tyres to pass the safety tests appropriate to a particular jurisdiction. Safety-critical systems are typically those systems whose failure would cause a significant increase in the risk to the safety of people or the environment.

Processing systems, such as data processing devices, often form an integral part of safety-critical systems, either as dedicated hardware or as processors for running safety-critical software. For example, fly-by-wire systems for aircraft, driver assistance systems, railway signalling systems and control systems for medical devices would typically all be safety-critical systems running on data processing devices. Where data processing devices form an integral part of a safety-critical system it is necessary for the data processing device itself to satisfy safety goals such that the system as a whole can meet the appropriate safety level. In the automotive industry, the safety level is normally an Automotive Safety Integrity Level (ASIL) as defined in the functional safety standard ISO 26262.

Increasingly, data processing devices for safety-critical systems comprise a processor running software. Both the hardware and software elements must meet specific safety goals. Some software failures can be systematic failures due to programming errors or poor error handling. These issues can typically be addressed through rigorous development practices, code auditing and testing protocols. Even if systematic errors could be completely excluded from a safety-critical system, random errors can be introduced into hardware, e.g. by transient events (e.g. due to ionizing radiation, voltage spikes, or electromagnetic pulses). In binary systems transient events can cause random bit-flipping in memories and along the data paths of a processor. The hardware may also have permanent faults.

The safety goals for a data processing device may be expressed as a set of metrics, such as a maximum number of failures in a given period of time (often expressed as Failures in Time, or FIT), and the effectiveness of mechanisms for detecting single point failures (Single Point Failure Mechanisms, or SPFM) and latent failures (Latent Failure Mechanisms, or LFM). There are various approaches to achieving safety goals set for data processing devices: for example, by providing hardware redundancy so that if one component fails another is available to perform the same task, or through the use of check data (e.g. parity bits or error-correcting codes) to allow the hardware to detect and/or correct for minor data corruptions.

For example, data processors can be provided in a dual lockstep arrangement 100 as shown in FIG. 1 in which a pair of identical processing units 101 and 102 are configured to process a stream of instructions 103 in parallel. The processing units 101 and 102 are typically synchronised for each stream of instructions such that the two processing units 101 and 102 execute that stream of instruction cycle-by-cycle, concurrently. The output of either one of the processing units 101, 102 may be used as the output 104 of the lockstep processor. When the outputs of the processing units 101 and 102 do not match, a fault can be raised to the safety-critical system. However, since a second processing unit is required, dual lockstep processors necessarily consume double the chip area compared to conventional processors and consume approximately twice the power.

In another example, by adding further processor units (not shown) to a lockstep processor 100, it can be possible to continue to provide an error-free output even when a fault is detected on one of those processor units. This can be achieved by using a process called modular redundancy. Here, the output of the lockstep processor may be that provided by two or more of its processing units, with the output of a processing unit which does not match the other units being disregarded. However, this further increases the area and power consumption of the processor.

Advanced driver-assistance systems and autonomous vehicles may incorporate data processing systems that must meet specific safety goals. For example, autonomous vehicles must process very large amounts of data (e.g. from RADAR, LIDAR, map data and vehicle information) in real-time in order to make safety-critical decisions. Such safety-critical systems in autonomous vehicles are typically required to meet the most stringent ASIL level D of ISO 26262. However, the increases in the area and power consumption (and therefore cost) of implementing a lockstep processor might not be acceptable or desirable in these applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect there is provided a method of processing an input task in a processing system, the method comprising: duplicating the input task so as to form a first task and a second task; allocating memory comprising: a first block of memory configured to store read-write data to be accessed during the processing of the first task; a second block of memory configured to store a copy of the read-write data to be accessed during the processing of the second task; and a third block of memory configured to store read-only data to be accessed during the processing of both the first task and the second task; and processing the first task and the second task at processing logic of the processing system so as to, respectively, generate first and second outputs.

The method may further comprise forming first and second signatures which are characteristic of, respectively, the first and second outputs; comparing the first and second signatures; and raising a fault signal if the first and second signatures do not match.

Forming first and second signatures which are characteristic of, respectively, the first and second outputs may comprise determining one or more of a checksum, a cyclic redundancy check, a hash and a fingerprint over, respectively, the first and second processed outputs.

The method may further comprise forming the first and second signatures prior to the first and second outputs accessing a memory hierarchy of the processing system.

The method may further comprise, prior to processing the first and second task, storing read-write data at a memory address of the first block of memory and storing a copy of that read-write data at a corresponding memory address of the second block of memory.

The first block of memory and the second block of memory may be allocated in a heap of memory, each memory address of the second block of memory being offset from a corresponding memory address in the first block of memory by a fixed memory address stride.

A plurality of input tasks may be processed at the processing system and the fixed memory address stride may be the same for each pair of first and second tasks formed from the respective input tasks.

The heap of memory may be a contiguous block of memory reserved for storing data for the processing of one or more input tasks at the processing system, the heap of memory being in a memory of the processing system.

The method may further comprise: receiving the second output; identifying, in the second output, a reference to a memory address in the first block of memory; updating that reference using the memory address stride; and accessing, using the updated reference, the corresponding memory address in the second block of memory.

The method may further comprise receiving an output and identifying that it was received from the second task so as to identify that output as the second output.

The third block of memory may be allocated in the heap of memory.

The method may further comprise submitting, concurrently, the first task and the second task to the processing logic.

The method may further comprise: fetching data from the first, second and third blocks of memory into a cache configured to be accessed by the processing logic during the processing of the first task and the second task.

The input task may be a safety task which is to be processed according to a predefined safety level.

The processing logic may comprise a first processing element and a second processing element, wherein said processing the first task and the second task at processing logic of the processing system comprises processing the first task at the first processing element and processing the second task at the second processing element.

The input task may be a test task comprising a predefined set of instructions for execution on the processing logic, the predefined set of instructions being configured to perform a predetermined set of operations on the processing logic when executed for predefined input data, and the method may further comprise receiving the test task at a processing unit comprising the first processing element and the second processing element.

The processing logic may comprise a particular processing element, wherein said processing the first task and the second task at processing logic of the processing system comprises processing the first task at the particular processing element and processing the second task at the particular processing element.

The first and second outputs may comprise intermediate outputs generated during the processing of, respectively, the first and second tasks. An intermediate output may be one or more of a load, store or atomic instruction generated during the processing of a task.

The processing logic may be configured to independently process the first and second tasks.

The input task may be a compute work-group comprising one or more compute work-items.

The method may further comprise, during the processing of the first task: reading read-write data from the first block memory; modifying that data in accordance with the first task; and writing that modified data back into the first block of memory.

The method may further comprise, during the processing of the second task: reading read-write data from the second block memory; modifying that data in accordance with the second task; and writing that modified data back into the second block of memory.

According to a second aspect there is provided a processing system configured to process an input task, the processing system comprising: a task duplication unit configured to duplicate the input task so as to form a first task and a second task; a memory allocation unit configured to allocate memory comprising: a first block of memory configured to store read-write data to be accessed during the processing of the first task; a second block of memory configured to store a copy of the read-write data to be accessed during the processing of the second task; and a third block of memory configured to store read-only data to be accessed during the processing of both the first task and the second task; and processing logic configured to process the first task so as to generate a first output, and to process the second task so as to generate a second output.

The processing system may further comprise: a check unit configured to form first and second signatures which are characteristic of, respectively, the first and second outputs; and a fault detection unit configured to compare the first and second signatures and raise a fault signal if the first and second signatures do not match.

The processing system may further comprise a heap of memory which comprises the first block of memory, the second block of memory and the third block of memory.

The processing systems described herein may be embodied in hardware on an integrated circuit. There may be provided a method of manufacturing, at an integrated circuit manufacturing system, a processing system described herein. There may be provided an integrated circuit definition dataset that, when processed in an integrated circuit manufacturing system, configures the system to manufacture a processing system described herein. There may be provided a non-transitory computer readable storage medium having stored thereon a computer readable description of a processing system described herein that, when processed in an integrated circuit manufacturing system, causes the integrated circuit manufacturing system to manufacture an integrated circuit embodying the processing system described herein.

There may be provided an integrated circuit manufacturing system comprising: a non-transitory computer readable storage medium having stored thereon a computer readable description of a processing system described herein; a layout processing system configured to process the computer readable description so as to generate a circuit layout description of an integrated circuit embodying the processing system described herein; and an integrated circuit generation system configured to manufacture the processing system described herein according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
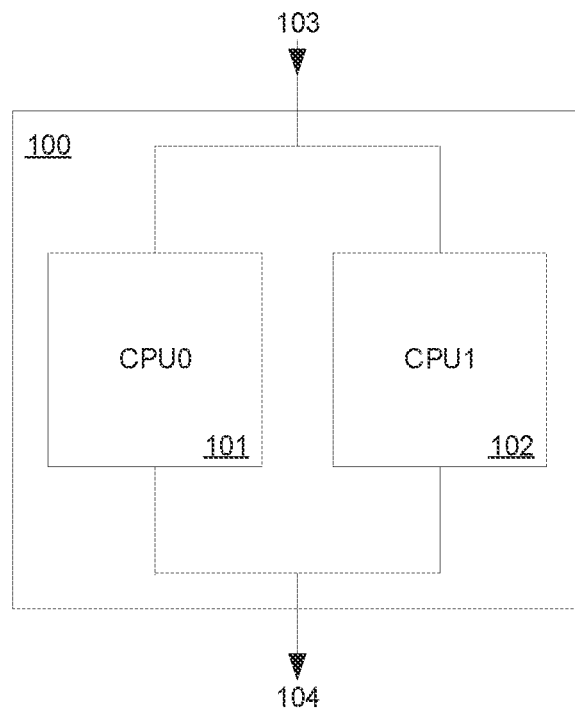
FIG. 1 shows a conventional dual lockstep processor.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

The present disclosure relates to the processing of tasks at a processing system. The processing system may be referred to as a data processing system herein. A data processing system configured in accordance with the principles herein may have any suitable architecture—for example, the data processing system could be operable to perform any kind of graphics, image or video processing, general processing and/or any other type of data processing.

The data processing system comprises processing logic, which includes one or more processing elements. For example, the data processing system may comprise a plurality of processing elements, which may be, for example, any kind of graphical and/or vector and/or stream processing elements. Each processing element may be a different physical core of a graphics processing unit (GPU) comprised by a data processing system. That said, it is to be understood that the principles described herein could be applied to the processing elements of any suitable type of processing unit, such as a central processing unit (CPU) having a multi-core arrangement. The data processing system may be applied to general computing tasks, particularly those which can be readily parallelised. Examples of general computing applications include signal processing, audio processing, computer vision, physical simulations, statistical calculations, neural networks and cryptography.

A task may be any portion of work for processing at a processing element. For example, a task may define one or more processing actions to be performed on any kind of data which the processing elements of a data processing system may be configured to process, such as vector data. A data processing system may be configured to operate on a plurality of different types of task. In some architectures, different processing elements or groups of processing elements may be allocated to process different types of task.

In an example, a task to be processed at the data processing system may be a compute work-group comprising one or more compute work-items. A compute work-item may be one instance of a compute kernel (e.g. a compute shader). One or more compute work-items may co-operatively operate on common data. Said one or more compute work-items may be grouped together into a so-called compute work-group. Each compute work-item in a compute work-group may execute the same compute kernel (e.g. compute shader), although each work-item may operate on different portions of the data common to those work-items. Such a compute work-group comprising one or more compute work-items can be dispatched for processing by a processing element of a data processing system. Each compute work-group may be independent of any other work-group. In another example, a task to be processed at the data processing system may be a test task, as will be described in further detail herein.

Figure 2:
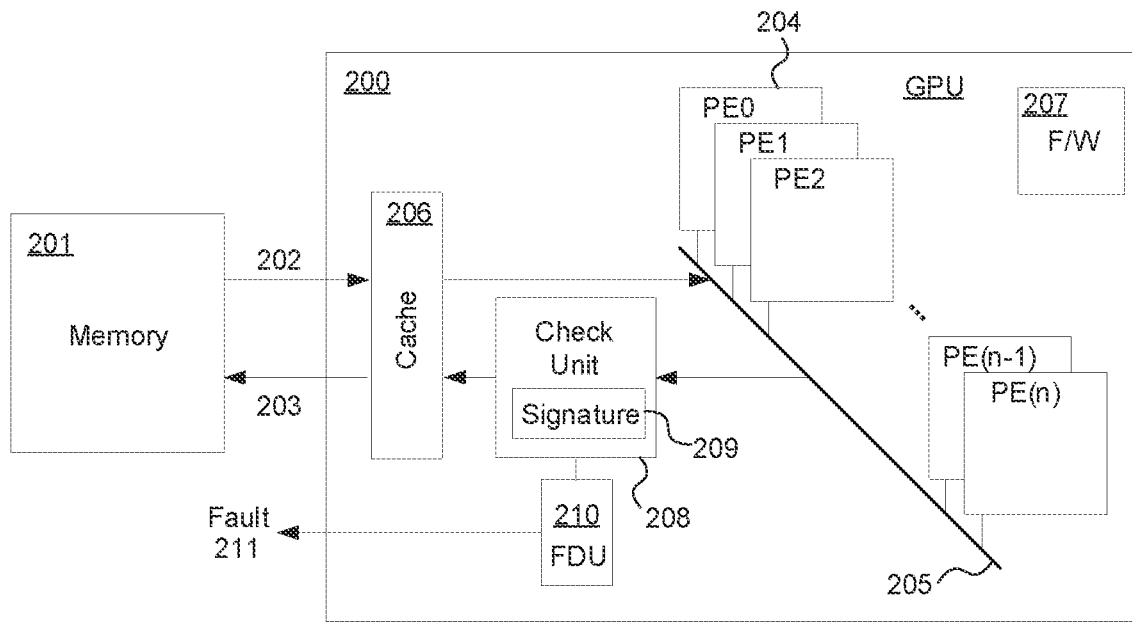
FIG. 2 shows a graphics processing unit configured in accordance with the principles described herein.

FIG. 2 shows a graphics processing unit configured in accordance with the principles described herein. It is to be understood that, whilst the present disclosure will be described with reference to a data processing system comprising a graphics processing unit (GPU), the principles described herein could be applied to a data processing system comprising any suitable type of processing unit, such as a central processing unit (CPU) having a multi-core arrangement.

A graphics processing unit (GPU) 200 may be part of the data processing system. The GPU 200 comprises a plurality of processing elements 204, labelled in the figure as PE0 to PE(n). The GPU 200 may include one or more caches and/or buffers 206 configured to receive data 202 from a memory 201, and provide processed data 203 to the memory 201. The memory 201 may comprise one or more data storage units arranged in any suitable manner. Typically, memory 201 would comprise a memory dedicated to the GPU and a system memory of the data processing system at which the GPU is supported.

The various units of the GPU 200 may communicate over one or more data buses and/or interconnects 205. The GPU may comprise firmware 207—for example to provide low-level control of the units of the GPU.

Each of the processing elements 204 of the GPU are operable to process a task, with the processing elements being arranged such that a plurality of processing elements can each perform a respective task at the same time. In this manner the GPU can concurrently process a plurality of tasks. Each processing element may comprise a plurality of configurable functional elements (e.g. shaders, geometry processors, vector processors, rasterisers, texture units, etc.) so as to enable a given processing element to be configured to perform a range of different processing actions. A processing element may process a task by performing a set of actions on a portion of data for the task. The set of actions may be defined as appropriate to a given task. A processing element may be configured by means of, for example, a software driver of the GPU passing appropriate commands to firmware 207 so as to enable/disable the functional elements of the processing element so as to cause the processing element to perform different sets of processing actions. In this manner, a first set of processing elements may be configured to, for example, perform vector processing of sensor data received from vehicular sensors, while another set of processing elements may be configured to, for example, perform shader processing on graphical tasks representing part of a computer-generated image of a scene (e.g. a tile). Each processing element may be able to process tasks independently of any other processing element. Therefore, a task processed at one processing element may not cooperate with another processing element in order to process that task (e.g. an individual task may not be processed in parallel at more than one processing element, although an individual task could be processed in parallel at a single processing element).

On processing a task, a processing element 204 generates an output in respect of that task. The output data may be a final output for the processing of that task, or intermediate output data generated during the processing of that task. The GPU 200 includes a check unit 208 which is operable to receive output data from a processing element and form a signature which is characteristic of that output data. For example, the signature may be characteristic of the output data as output from a processing element. In other words, the signature may be characteristic of the output data at the point it is output from a processing element. The check unit may determine, for example, a checksum, hash, cyclic redundancy check (CRC), or fingerprint calculation on the output data. The check unit may operate on data generated by a processing element processing a task. Said data may include memory addresses and/or control data associated with that generated data—this can help the validation operations described herein to identify a wider range of faults. The signature provides an expression of the processing performed on a task by a processing element in a more compact form than the output data itself so as to facilitate comparison of the output data provided by different processing elements. Preferably the check unit forms a signature over all of the output data (which might not include any control data) received from a processing element in respect of a task, but the signature could be formed over some (e.g. not all) of the output data received from a processing element in respect of a task. The check unit 208 may receive output data from a processing element over the data bus/interconnect 205.

The check unit 208 may comprise a data store 209 for storing one or more signatures formed at the check unit. Alternatively, or additionally, the check unit may make use of a data store external to the check unit (e.g. at a memory of the GPU 200) for storing one or more signatures formed at the check unit. The check unit may receive output data from all or a subset of the processing elements of the GPU. The check unit may comprise a plurality of check unit instances—for example, each check unit instance may be configured to receive output data from a different subset of processing elements of the GPU.

The GPU 200 further comprises a fault detection unit 210 which is configured to compare two or more signatures formed at the check unit 208. The fault detection unit 210 is configured to raise a fault signal 211 on determining that signatures do not match. A fault could potentially lead to a safety violation at the GPU. The fault signal may be provided in any suitable manner as an output of the GPU 200. For example, the fault signal may be one or more of: control data; an interrupt; data written out to memory 201; and data written to a register or memory of the GPU 200 or a system to which the GPU is connected.

The fault detection unit 210 is for comparing the signatures of output data from different processing elements 204 arranged to process the same task. A task may be processed multiple times (e.g. twice) by one or more processing elements. The processing performed by the processing element(s) for processing the task multiple times may or may not be concurrent. If two processing elements are arranged to process the same task, comparing the signatures characteristic of the output data as output from the processing elements indicates whether the processing performed by the pair of processing elements is in agreement. When the signatures of a pair of processing elements in respect of a given task do not match, the fault signal 211 indicates that a fault occurred at one of the processing elements of the pair but the fault signal does not indicate which processing element experienced the fault.

If a task is processed three or more times (e.g. by a group of three or more processing elements arranged to process the task), comparing the signatures characteristic of the output data from the processing elements which process the task indicates whether the processing performed by the processing elements is in agreement. In this example, when the three or more signatures determined from the processing of the task do not match, the fault signal 211 indicates that a fault occurred at one of the processing elements and it can further indicate at which one of the processing elements the fault occurred. This is because the fault can be assumed to have occurred at the processing element whose signature does not match the signatures of the outputs from the two or more other processing elements.

Figure 3:
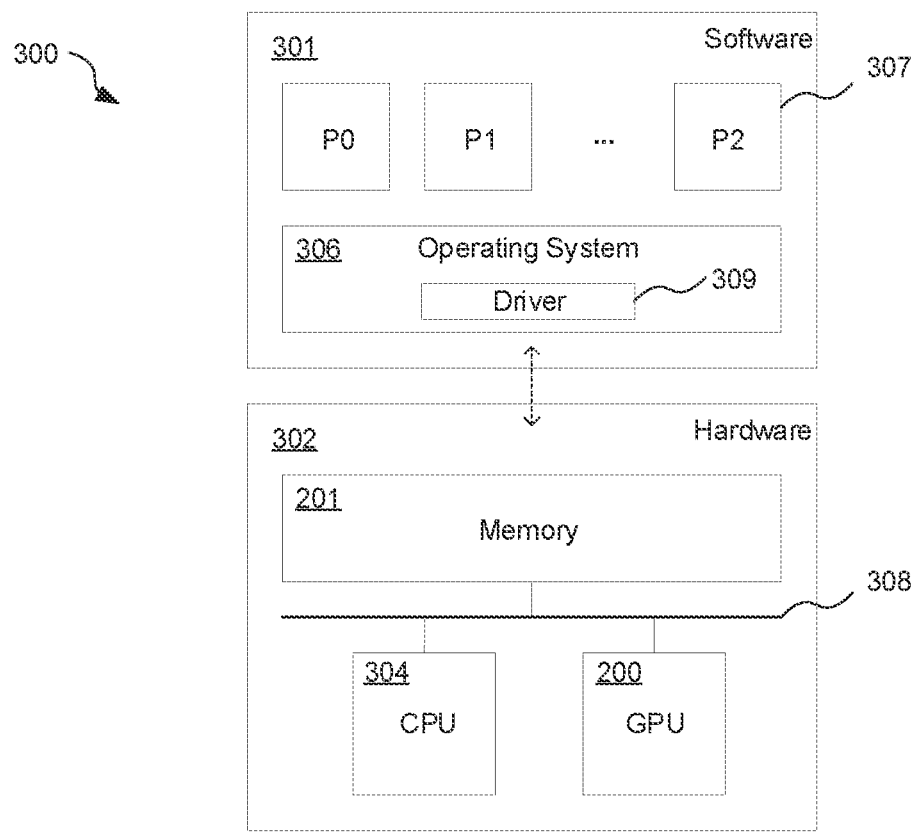
FIG. 3 shows a data processing system comprising a graphics processing unit configured in accordance with the principles described herein.

The GPU 200 can be incorporated into a data processing system such as data processing system 300 shown in FIG. 3. Such a data processing system may comprise other processors such as a central processing unit (CPU) 304, and memory 201. The hardware 302 may comprise one or more data buses and/or interconnects 308 over which the processors 200, 304 and memory 201 may communicate. Typically, a software environment 301 is provided at the data processing system in which a plurality of processes 307 may execute. An operating system 306 may provide an abstraction of the available hardware 302 to the processes 307. The operating system may include a driver 309 for the GPU 200 so as to expose the functionalities of the GPU 200 to the processes. All or part of the software environment 301 may be provided as firmware. In an example, the data processing system 300 forms part of a vehicle control system, with the processes each performing one or more control functions of the vehicle, such as instrument cluster display, entertainment system, engine management, climate control, lane control, steering correction, automatic braking systems, etc. One or more of the processes 307 may be safety-critical processes. The processes may be a mix of safety-critical processes which must be executed according to a predefined safety level and non-safety-critical processes which do not need to be executed according to a predefined safety level.

A fault signal may be used in any manner by a data processing system 300 in which the GPU is incorporated. For example, on a fault signal being raised by the fault detection unit, the system in which the GPU is incorporated may discard output data formed in respect of the subject task and/or cause the task to be resubmitted to the GPU for reprocessing. The GPU may itself use the fault signal 211. For example, the GPU may log fault signals and the processing elements those faults are associated with, and if one or more processing elements exceed a predefined number of faults (perhaps within some defined time period), those one or more processing elements may be disabled or otherwise prevented from processing tasks received at the GPU.

The GPU as shown in FIG. 2 is operable to process tasks so as to meet a predefined safety level. For example, the graphics processing system may be certified to meet the ASIL B or ASIL D standards of ISO 26262. Tasks which require processing to the predefined safety level may be tasks relating to safety-critical functions of a data processing system 300 into which the GPU may be incorporated. For example, in an automotive application, tasks which are safety-critical may be those tasks relating to the image processing of data captured by one or more vehicle cameras for use in a lane assist system.

As described herein, the task to be processed at the data processing system may be a test task. A test task can be received at a processing unit (e.g. GPU 200 shown in FIG. 2) of the processing system. A test task may be used to verify processing logic of the processing unit. A test task comprises a predefined set of instructions for execution on the processing logic—for example, the processing element(s). The predefined set of instructions are configured to perform a predetermined set of operations on the processing logic when executed for predefined input data. For example, the test task may require a specific set of data manipulation operations to be performed to target a specific set of logic on the processing element(s), or may specify a set of reads/writes to be performed to target certain pathways to/from memory. The predefined set of instructions may be configured to perform a different predetermined set of operations on the processing logic when executed for different predefined input data. A test task verifies the subset of the logic on a hardware arrangement (e.g. GPU 200 shown in FIG. 2) that it is programmed to use. That is, a test task can verify that the specific set of logic that it is programmed to use is functioning correctly. In other words, test tasks represent an approach to hardware testing that involves providing particular, specially designed, tasks as stimuli to a component to see if the component provides an expected result. Different test tasks can be designed for different hardware arrangements (e.g. different graphics processing units). That is, the specific predefined set of instructions defining the test task can vary depending on the hardware arrangement and capabilities of the processing logic to be verified. A skilled person (e.g. a software engineer) would be capable of designing, on instruction, an appropriate test task according to the principles described herein that is suitable for the processing logic to be verified.

An example method of processing a task (referred to as an input task herein) at a data processing system in accordance with the principles described herein will be described with reference to FIGS. 4 and 5. It is to be understood that an input task may be generated by a process executing at the processing system (e.g. one of the plurality of processes 307 shown in FIG. 3), may be generated (e.g. spawned) by another task being processed at the processing system, or may be generated in any other suitable manner. In brief, the input task is duplicated so as to form a first task and a second task. Memory to be accessed during the processing of the first and second task is allocated—as will be described in further detail herein. The first and second tasks are processed by processing logic of the processing system to generate first and second outputs. For example, the first task is processed at a first processing element and the second task is processed at a second processing element so as to, respectively, generate first and second outputs. First and second signatures may be formed which are characteristic of, respectively, the first and second outputs. The first and second signatures may be compared, and a fault signal may be raised if the first and second signatures do not match.

Figure 4:
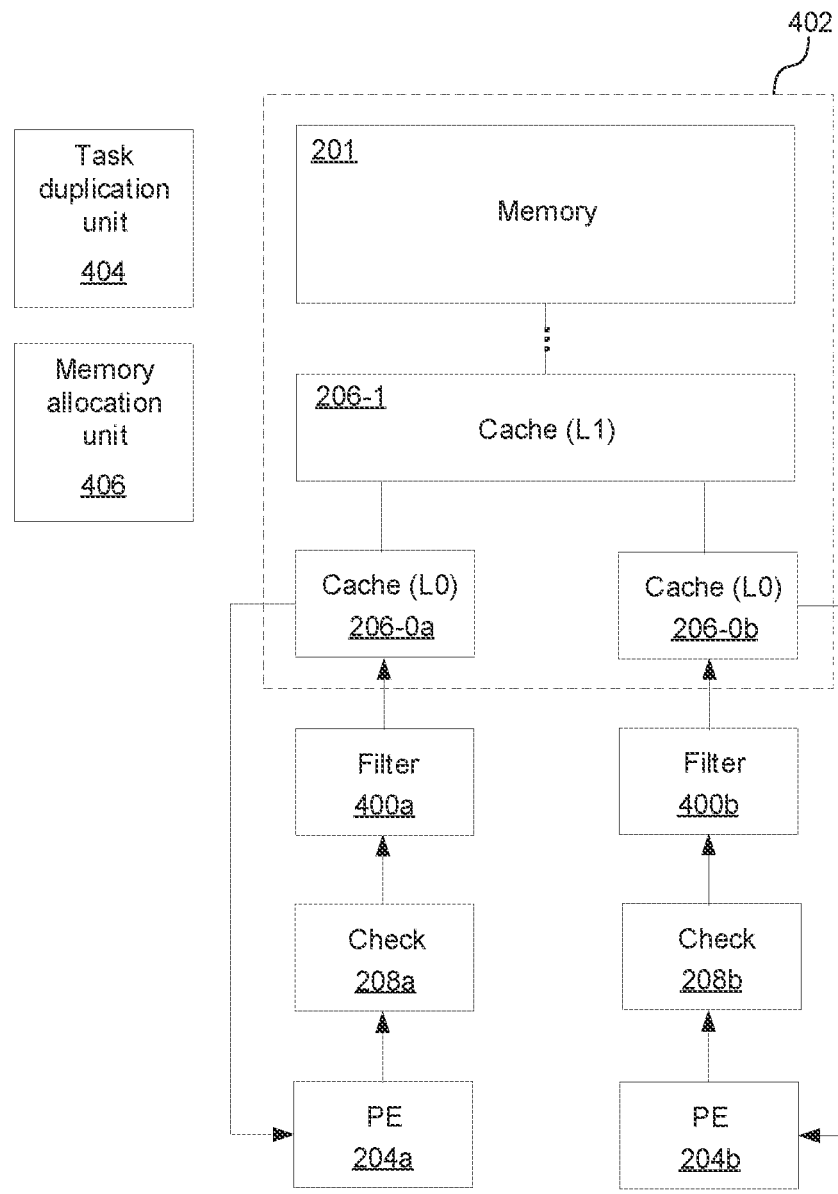
FIG. 4 shows an exemplary logical arrangement of units of the data processing system shown in FIG. 3 for processing an input task in accordance with the principles described herein.

FIG. 4 shows an exemplary logical arrangement of units of the data processing system shown in FIG. 3 for processing a task in this manner. FIG. 4 shows a first processing element 204a and a second processing element 204b. The first and second processing elements 204a and 204b may have the same properties as the processing elements 204 described with reference to FIG. 2. FIG. 4 also shows first and second check units 208a and 208b. The first check unit 208a may be configured to check outputs generated by the first processing element 204a. The second check unit 208b may be configured to check outputs generated by the second processing element 204b. The first and second check units 208a and 208b may be instances of check unit 208 described with reference to FIG. 2. FIG. 4 shows first and second filter units 400a and 400b—as will be described in further detail herein. For ease of explanation, the first and second filters 400a and 400b are shown in FIG. 4 as logically separate units to the first and second check units 208a and 208b—however, the first and second filters 400a and 400b may, in fact, be part of check unit 208 shown in FIG. 2. The first and second filters 400a and 400b may be implemented in hardware (e.g. fixed function circuitry), software, or any combination thereof. The first filter unit 400a may be configured to filter outputs generated by the first processing element 204a. The second filter unit 400b may be configured to filter outputs generated by the second processing element 204b. The outputs of the first and second filter units 400a and 400b may be received at memory hierarchy 402 of the data processing system. The memory hierarchy 402 shown in FIG. 4 includes a first L0 cache 206-0a and a second L0 cache 206-0b. The first L0 cache 206-0a may be accessible by the first processing element 204a. That is, the first processing element 204a may output instructions requesting to read data from, or write data to, the first L0 cache 206-0a—whilst the second processing element 204b may not. The second L0 cache 206-0b may be accessible by the second processing element 204b. That is, the second processing element 204b may output instructions requesting to read data from, or write data to, the second L0 cache 206-0b—whilst the first processing element 204a may not. The first L0 cache 206-0a and a second L0 cache 206-0b may be local to (e.g. implemented on the same physical chip as) the GPU comprising the first and second processing elements 204a and 204b. The first L0 cache 206-0a and a second L0 cache 206-0b may be populated with data from an L1 cache 206-1. The L1 cache 206-1 may be accessible by both the first and second processing elements 204a and 204b. That is, both the first and second processing elements 204a and 204b may output instructions requesting to read data from, or write data to, the L1 cache 206-1. The L1 cache 206-1 may be local to (e.g. implemented on the same physical chip as) the GPU comprising the first and second processing elements 204a and 204b. The L1 cache 206-1 may be populated with data from memory 201 (e.g. having the same properties as memory 201 shown in FIG. 2 or 3). The memory 201 may not be local to (e.g. implemented on the same physical chip as) the GPU comprising the first and second processing elements 204a and 204b. The memory hierarchy 402 may include one or more additional cache levels between the L1 cache 206-1 and memory 201 (e.g. an L2 cache, or an L2 and an L3 cache, etc.—not shown in FIG. 4). The processing system shown in FIG. 4 also comprises a task duplication unit 404 configured to duplicate an input task so as to form a first task and a second task—as will be described in further detail herein. The processing system shown in FIG. 4 also comprises a memory allocation unit 406 configured to allocate memory to be accessed during the processing of the first and second tasks—as will be described in further detail herein. The task duplication unit 404 and memory allocation unit 406 may be implemented at a driver of the processing system (e.g. driver 309 shown in FIG. 3). The task duplication unit 404 and memory allocation unit 406 may be implemented in hardware, software, or any suitable combination thereof.

Figure 5:
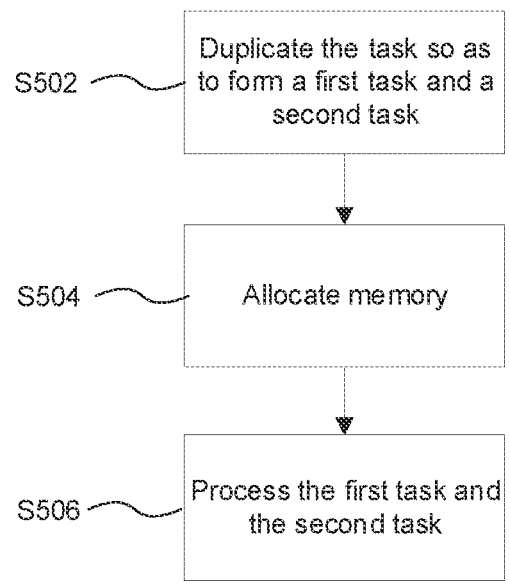
FIG. 5 shows a method of processing an input task at a data processing system in accordance with the principles described herein.

FIG. 5 shows a method of processing a task at a data processing system in accordance with the principles described herein. The task may be a safety task which is to be processed according to a predefined safety level. The task may be a compute work-group comprising one or more compute work-items as described herein. The task may be a test task as described herein.

The input task is duplicated in step S502 so as to form a first task and a second task. For example, the first task may be referred to as the "mission" task and the second task may be referred to as a "safety task" or a "redundant task". The task may be duplicated by the task duplication unit 404. In an example, duplicating an input task may comprise creating a copy of that task. For example, the second task may be defined by a copy of each instruction or line of code defining the first task. In another example, duplicating an input task may comprise invoking the input task for processing twice (e.g. without creating a copy of the input task). That is, an input task may be defined by a program stored in memory (e.g. memory 201). An input task can be invoked for processing by providing a processing element with a reference to that program in memory. Thus, an input task can be duplicated by the task duplication unit 404 providing that reference to memory to the processing element that is to process the first task, and providing the same reference to memory to the processing element that is to process the second task.

In step S504, memory to be accessed during the processing of the first and second tasks is allocated. That is, one or more portions of memory 201 are allocated for storing data to be accessed during the processing of the first and second tasks. Memory may be allocated by the memory allocation unit 406.

Different types of data may be accessed during the processing of a task. One example is "read-only" data, which is data that a processing element processing a task is permitted to read, but is not permitted to write over. That is, a processing element is not permitted to write to a memory address comprising read-only data. Another type of data that may be accessed during the processing of a task is "read-write" data, which is data that a processing element processing a task is permitted to read, modify, and write back to memory. That is, a processing element may read read-write data from memory, modify that data in accordance with the task being processed, and write that modified data back into the memory.

In accordance with the principles described herein, the allocated memory to be accessed during the processing of the first and second task comprises a first block of memory configured to store read-write data to be accessed during the processing of the first task, and a second block of memory configured to store a copy of that read-write data to be accessed during the processing of the second task, and a third block of memory configured to store read-only data to be accessed during the processing of both the first task and the second task. The first and second blocks of memory may be termed "read-write" buffers. The third block of memory may be termed a "read-only" buffer. The first block of memory may not be accessed during the processing of the second task. That is, the processing element processing the second task may not modify (e.g. write modified read-write data to) the first block of memory during the processing of the second task. The second block of memory may not be accessed during the processing of the first task. That is, the processing element processing the first task may not modify (e.g. write modified read-write data to) the second block of memory during the processing of the first task.

The memory allocation unit 406 allocates a first block of memory and a second block of memory in this way so that the first processing element and the second processing element do not share access to the same instance of the read-write data. Instead, the first processing element is permitted to access read-write data stored in the first block of memory, whilst the second processing element is permitted to access a copy (e.g. duplicate) of that read-write data in the second block of memory. The reason for allocating first and second blocks of memory in this way is that if, for example, the first and second processing elements were to be permitted to share access to read-write data during the processing of the first and second tasks, and the first processing element processing the first task were to read that data and perform a set of instructions to modify it before writing the modified data back, and then, subsequently, the second processing element processing the second task were to attempt to access the original read-write data to perform the same set of instructions, the second task would in fact be accessing the modified read-write data, and thus performing the same set of instructions would form a different output. If this were to occur, the check unit 208 (e.g. via first and second check unit instances 208a and 208b) would identify a mismatch in the outputs of the first and second processing elements, and thereby raise a fault signal, even if the first and second processing elements themselves were operating normally.

By contrast, as the first and second processing elements are not permitted to modify or write over read-only data, they can be permitted to share access to read-only data. That is, as read-only data cannot be modified by either processing element, it can be assured both processing elements accessing a shared memory address configured to store read-only data will be accessing the same read-only data, even if one processing element accesses that data subsequently to the other. Hence, the memory allocation unit 406 can allocate a third block of memory configured to store read-only data to be accessed during the processing of both the first task and the second task.

Figure 6A:
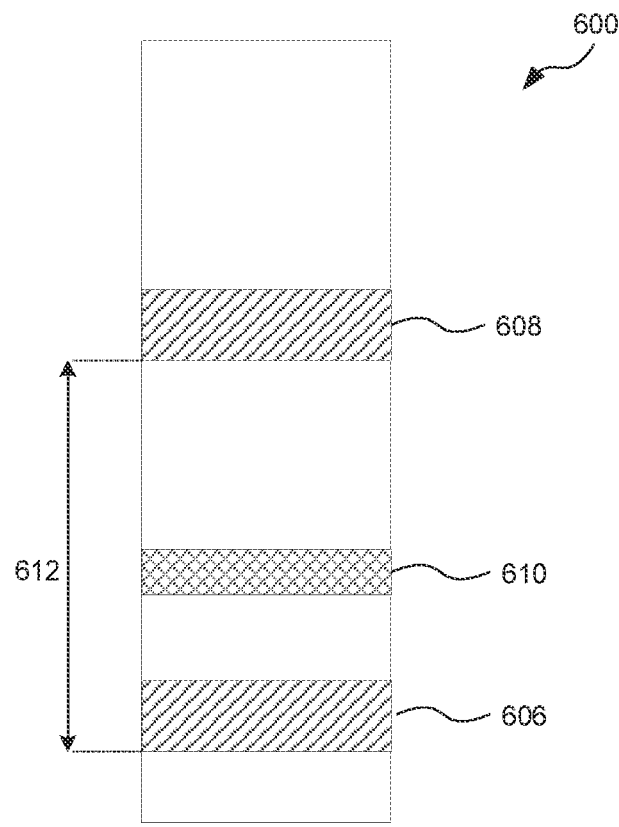
FIGS. 6a-c show an exemplary allocation of first, second and third blocks of memory in accordance with the principles described herein.

The allocation of memory is described in further detail with reference to FIGS. 6a, 6b and 6c. FIG. 6a shows a heap of memory 600 in which first 606, second 608 and third 610 blocks of memory have been allocated. The heap of memory may be a contiguous block of memory reserved for storing data for the processing of one or more input tasks at the data processing system. The heap of memory may be in a memory 201 of the data processing system. FIG. 6a shows a first block of memory 606 configured to store read-write data to be accessed during the processing of the first task and a second block of memory 608 configured to store a copy of that read-write data to be accessed during the processing of the second task. The first block of memory 606 may span a first range of contiguous memory addresses in the heap of memory 600. The second block of memory 608 may span a second range of contiguous memory addresses in the heap of memory 600. Each memory address of the first block of memory 606 may be offset from a corresponding memory address in the second block of memory 608 by a fixed memory address stride 612. For example, the base (e.g. first) memory address of the first block of memory 606 may be offset from the corresponding base (e.g. first) memory address in the second block of memory 608 by the fixed memory address stride 612. Corresponding memory addresses in the first and second blocks of memory may be configured to store the "same" read-write data. That is, read-write data may be stored at a memory address of the first block of memory 606 whilst a copy of that read-write data may be stored at the corresponding memory address of the second block of memory 608.

It is to be understood that the use of a fixed memory address stride to map corresponding memory addresses in the first and second blocks of memory to each other is given by example only, and that other methods for mapping between corresponding memory addresses in the first and second blocks of memory can be used. For example, corresponding memory addresses in the first and second blocks of memory could be mapped to one another using a look-up table. The look-up table may be stored in memory 201. The memory allocation unit 406 may be responsible for populating the look-up table with the mappings between corresponding memory addresses in the first and second blocks of memory. In this example, there need not be any fixed relationship between corresponding memory addresses within the first and second blocks of memory.

FIG. 6a also shows a third block of memory 610 configured to store read-only data to be accessed during the processing of both the first task and the second task. The third block of memory 610 may span a third range of contiguous memory addresses in the heap of memory 600.

A plurality of input tasks may be processed at the data processing system and the fixed memory address stride may be the same for each respective duplicate pair of first and second tasks. This can be understood with reference to FIG. 6b. In this way, the heap of memory 600 can be conveniently "divided" into a first sub-heap 602 and a second sub-heap 604. The first sub-heap 602 may be referred to as the "mission heap" and the second sub-heap 604 may be referred to as the "safety sub-heap". The base (e.g. first) memory address of the first sub-heap 602 may be offset from the corresponding base (e.g. first) memory address second sub-heap 604 by the fixed memory address stride 612. In this example, the fixed memory address stride 612 may be conveniently defined as half the size of the heap of memory 600. In this way, when a first block of memory to be accessed during the processing of a mission task is allocated within the mission heap 602, by virtue of the fixed memory address stride 612, the corresponding second block of memory to be accessed during the processing of the corresponding safety task will be allocated within the safety heap 604. For example, FIG. 6b shows a heap of memory 600 in which first 606a, second 608a and third 610a blocks of memory have been allocated to be accessed during the processing of first and second tasks associated with a first input task, and first 606b, second 608b and third 610b blocks of memory have been allocated to be accessed during the processing of first and second tasks associated with a second input task.

Figure 6B:
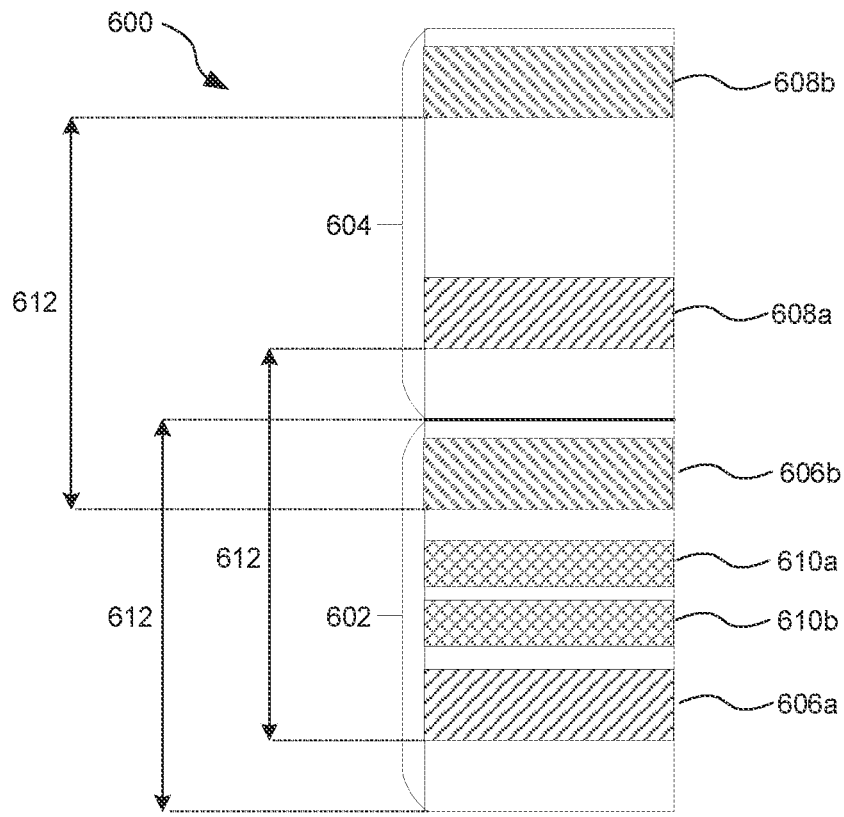

Allocating memory as described with reference to FIG. 6b is convenient in that it is computationally more straightforward to manage the allocation of memory resources when the same fixed memory address stride 612 is used for each input task. In addition, it enables the driver (e.g. driver 309 in FIG. 3) to manage memory resources by "exposing" (e.g. indicating the availability of) only half of the available memory to processes issuing input tasks (e.g. processes 307 in FIG. 3). For example, if 12 GB of memory is actually available, the driver 309 may indicate to the processes 307 that 6 GB of memory is available to be accessed during the processing of input tasks. The processes 307 are unaware that the driver 309 is configured to duplicate the read-write data to be accessed during the processing of the input task—and thus will not account for this duplication in the amount of memory it requests. By only exposing half of the available memory to the processes 307, it can be assured that sufficient memory is available to store the data to be accessed during the processing of the task (as requested by the processes 307) as well as a copy of the read-write data. By using the same fixed memory address stride 612 and always allocating memory for the read-only buffers 610a and 610b in the mission heap 602 as shown in FIG. 6b, it can also be assured that, if space is available for a read-write buffer 606a, 606b in the mission heap 602, a corresponding block of memory will always be available for the copy of that read-write buffer 608a, 608b in the safety heap 604. That said, a potential disadvantage of this approach is that the safety heap 604 can become sparsely populated.

Thus, alternatively, for a plurality of input tasks, the fixed memory address stride may be variable between respective duplicate pairs of first and second tasks. In other words, the memory address stride may be "fixed" for each individual pair of first and second tasks formed from a particular input task, but the memory address strides that are applied to different pairs of first and second tasks formed from different respective input tasks may be different. This can be understood with reference to FIG. 6c. FIG. 6c shows a heap of memory 600 in which first 606a, second 608a and third 610a blocks of memory have been allocated to be accessed during the processing of first and second tasks associated with a first input task, and first 606b, second 608b and third 610b blocks of memory have been allocated to be accessed during the processing of first and second tasks associated with a second input task. Here, the fixed memory address stride 612a between the first 606a and second 608a blocks of memory for the first input task is larger than the fixed memory address stride 612b between the first 606b and second 608b blocks of memory for the second input task. The fixed memory address stride for each input task may be determined dynamically by the driver in dependence on the available memory. In addition, FIG. 6c shows that the third blocks of memory 610a and 610b can be allocated dynamically in any portion of the heap of memory 600—for example, depending on memory availability. This approach is advantageous as the heap of memory may be more efficiently (e.g. less sparsely) packed relative to the approach described with reference to FIG. 6b. That said, allocating memory in this manner may be computationally less straightforward to manage.

Figure 6C:
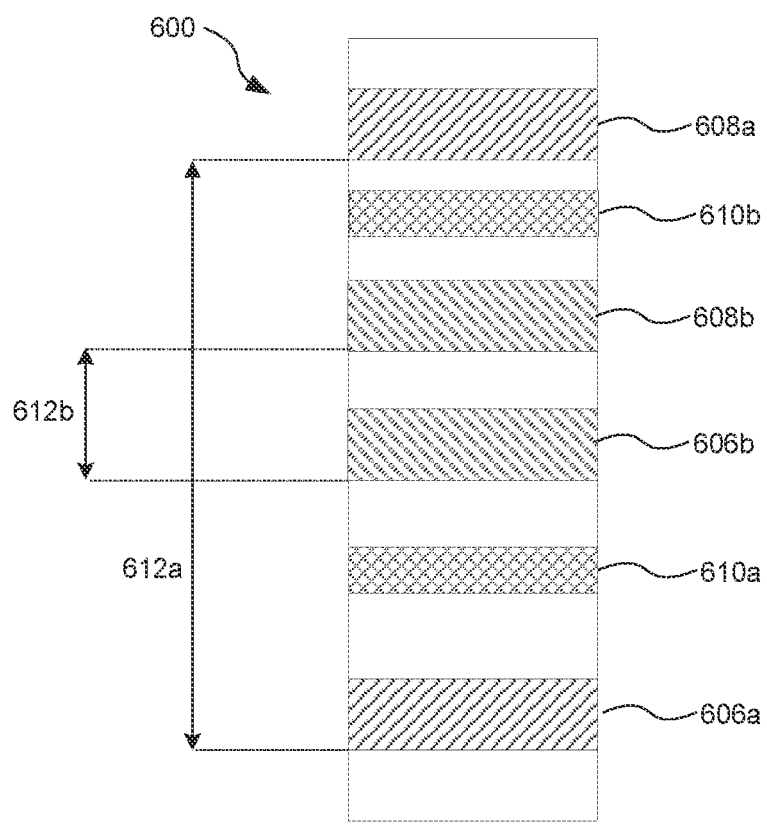

In FIGS. 6b and 6c, it is shown that the first and second input tasks are each allocated a third block of memory configured to store read-only data (e.g. blocks 610a and 610b) data to be accessed during the processing of each respective duplicate pair of first and second tasks. It is to be understood that this need not be the case—it is possible (e.g. where the first and second input tasks refer to the same read-only data) for first and second input tasks to share access to a single third block of memory configured to store read-only data to be accessed during the processing of each respective duplicate pair of first and second tasks.

Returning to FIG. 5, in step S506, the first task is processed at the first processing element 204a and the second task is processed at a second processing element 204b so as to, respectively, generate first and second outputs. The first and second processing elements 204a and 204b may be identical. That is, the first and second processing elements 204a and 204b may comprise the same hardware and be configured in the same manner (e.g. by firmware 207 in FIG. 2, potentially under the instruction of driver 307 in FIG. 3). Also, as described herein, the first and second tasks are duplicates. Thus, in the absence of any faults, the computation occurring at each of the first and second processing elements 204a and 204b during the processing of, respectively, the first and second tasks, should be identical, and so should yield matching outputs.

The driver (e.g. driver 309 in FIG. 3) may be responsible for submitting (e.g. scheduling) the first and second tasks for processing on, respectively, the first and second processing elements 204a and 204b. The first and second tasks may be submitted by the driver in parallel (e.g. concurrently) to, respectively, the first and second processing elements 204a and 204b. As above, the L1 cache 206-1 may be populated with data from memory 201 (e.g. using data from the memory allocated in step S504), whilst the first L0 cache 206-0a and a second L0 cache 206-0b may be populated with data from an L1 cache 206-1. Thus, by submitting the first task and the second task in parallel, the data processing system is likely to benefit from the caching of the data to be accessed during the processing of those tasks (e.g. in L1 cache 206-1). That is, by submitting the first task and the second task concurrently, it is likely that the data to be accessed during the processing of those tasks (or at least a large portion of it) can be fetched from memory 201 once, and cached in L1 cache 206-1 to be accessed by both the first and second task—rather than each processing element having to fetch that data from memory 201 separately.

Although the first and second tasks may be submitted to the first and second processing elements 204a and 204b concurrently, the first and second processing elements 204a and 204b may be configured to independently process the first and second tasks, respectively. That is, the first and second processing elements 204a need not be synchronised for each duplicate pair of first and second tasks so as to execute those tasks cycle-by-cycle, concurrently.

As described herein, the first task is processed at the first processing element 204a and the second task is processed at a second processing element 204b so as to, respectively, generate first and second outputs. An output may be a final output for the processing of that task, or an intermediate output generated during the processing of that task. For example, an intermediate output may be one or more of a load, store or atomic instruction generated during the processing of a task. Intermediate outputs can include references to memory addresses. That is, intermediate outputs may comprise requests to access data in memory to be used during the processing of a task.

Figure 7:
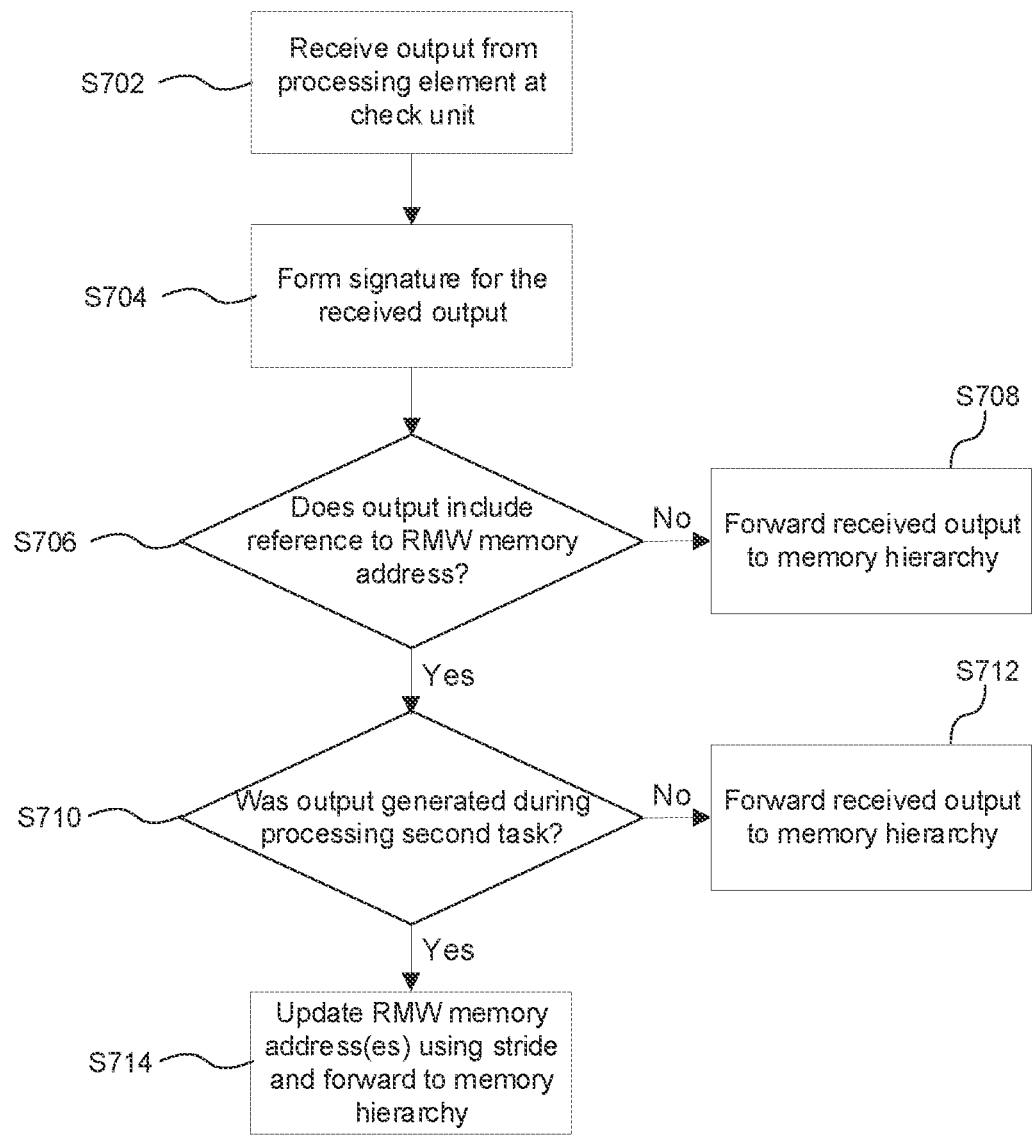
FIG. 7 shows an exemplary set of steps performed by the check and filter units in accordance with the principles described herein.

An exemplary set of steps performed by each check unit 208a, 208b and filter unit 400a, 400b in response to an intermediate output generated during the processing of the first and second tasks at the first and second processing elements 204a and 204b will be described with reference to FIG. 7.

In step S702, an output generated during the processing of a task at a processing element is received at a check unit (e.g. check unit 208a or 208b). The steps performed at check units 208a and 208b are identical, regardless of whether the processing element that they are associated with is processing the first (e.g. "mission") or second (e.g. "safety" task). As described herein, the first and second tasks are duplicates and the first and second processing elements 204a and 204b are preferably identical, and so, in the absence of any faults, the processing of the first and second tasks should be identical, and so should yield matching outputs.

In step S704, that check unit forms a signature which is characteristic of the received output. For example, the signature may be characteristic of the output data as output from the processing element. In other words, the signature may be characteristic of the output data at the point it is output from the processing element. As described herein, forming a signature characteristic of the received output may comprise performing one or more of a checksum, CRC, a hash and a fingerprint over, respectively, that output. Preferably the check unit forms a signature over all of the output data (which may include any referenced memory addresses) received from a processing element in respect of a task, but the signature could be formed over some (e.g. not all) of the output data received from a processing element in respect of a task. For example, when duplicating the input task so as to form the first and second task, the task duplication unit 404 (e.g. implemented at driver 309 in FIG. 3) may have marked any references to memory addresses in the first, second and third blocks of memory with flags. The first and second tasks may also include references to other memory addresses that the task duplication unit 404 has not flagged—e.g. references to memory addresses in spilled registers, which can be non-deterministic. The check unit may form the signature over the output data including only memory addresses present in that output data that have been flagged. In this way, non-deterministic references to memory addresses can be excluded from the signature. The signature may be stored (e.g. in data store 209 shown in FIG. 2) for comparison to the signature formed for the corresponding output generated during the processing of the other of the first and second tasks. The comparison of signatures and, where applicable, raising of fault signals has been described previously herein.

It is noted that a signature which is characteristic of the received output is preferably formed by the check unit (e.g. check unit 208a or 208b) prior to that output accessing the memory hierarchy 402. That is, a signature which is characteristic of the received output is preferably formed by the check unit (e.g. check unit 208a or 208b) prior to that output accessing the respective L0 cache (e.g. L0 cache 206-0a or 206-0b). This is because the output of the L0 cache could be non-deterministic depending on when cache lines are evicted, and so even if the inputs to the L0 cache are identical, the outputs may not be. After forming a signature, the check unit (e.g. check unit 208a or 208b) may forward the intermediate output onto the respective filter unit (e.g. filter unit 400a or 400b).

In step S706, the filter unit (e.g. filter unit 400a or 400b) may determine whether the intermediate output includes a reference to a memory address configured to store read-write data. In one example, when duplicating the input task so as to form the first and second task, the task duplication unit 404 (e.g. implemented at driver 309 in FIG. 3) may have marked any references to memory addresses configured to store read-write data in the first and second tasks with flags—so as to enable the filter unit to quickly identify those memory addresses.

If the intermediate output does not include a reference to a memory address configured to store read-write data, it may be forwarded in step S708 to memory hierarchy 402.

If the intermediate output does include a reference to a memory address configured to store read-write data, in step S710, the filter unit (e.g. filter unit 400a or 400b) may determine whether the intermediate output was generated during the processing of the second task. That is, for example, the filter unit (e.g. filter unit 400a or 400b) may determine whether the intermediate output was received from the second processing element 204b. In one example, when submitting the second task for processing by the second processing element, the driver (e.g. driver 309 in FIG. 3) may identify the second filter unit 400b as being associated with the second processing element 204b, e.g. by setting a configuration bit in a register associated with the filter unit 400b. Thus, the filter unit (e.g. filter unit 400a or 400b) may determine whether the intermediate output was generated during the processing of the second task by inspecting said configuration bit.

If it is determined that the intermediate output was not generated during the processing of the second task (e.g. it was generated during the processing of the first task), it may be forwarded in step S712 to memory hierarchy 402. Here, the intermediate output can access read-write data at the referenced memory address (e.g. in the first block of memory).

If it is determined that the intermediate output was generated during the processing of the second task, the reference to a memory address configured to store read-write data may be updated in step S714. That is, the reference to a memory address in the first block of memory may be modified by the filter unit 400b so as to reference the corresponding memory address in the second block of memory. In an example, this can be achieved in dependence on the fixed memory address stride, e.g. by adding the fixed memory address stride onto the memory address in the first block of memory so as to determine the corresponding memory address in the second block of memory. In another example, this can be achieved by referencing a look-up table to map the memory address in the first block of memory to the corresponding memory address in the second block of memory. The updated intermediate output can be forward onto the memory hierarchy 402, where the corresponding memory address in the second block of memory can be accessed at the updated referenced memory address. For example, accessing the corresponding memory address in the second block of memory may comprise reading read-write data from the second block of memory and returning that data to the second processing element. In an example, data returned from the memory hierarchy 402 may not include references to memory addresses, and thus need not be routed via the filter unit 400b. In another example, accessing the corresponding memory address in the second block of memory may comprise writing read-write data modified by the second processing element to the corresponding memory address.

That is, the filter unit (e.g. filter unit 400a or 400b) may update the intermediate output when it is determined to: (i) include a reference to a memory address configured to store read-write data, and (ii) be generated during processing of second task. To this end, it is to be understood that steps S706 and S710 could be performed in the opposite order to that described with reference to FIG. 7.

It is noted that, in the example described with reference to FIG. 7, the filter units 400a and 400b are logically positioned after the check units 208a and 208b. In this way, the updating of read-write memory addresses referenced in outputs by the second processing element do not cause disparities in the signatures formed by the check units 208a and 208b. It is to be understood that this need not be the case. For example, the check units 208a and 208b may be configured so as to form signatures that do not take account of memory addresses referenced in the intermediate outputs.

In this example, the filter units 400a and 400b may be logically positioned prior to the check units 208a and 208b, respectively. Alternatively, in this example, the driver (e.g. driver 309 in FIG. 3) may update any references to memory addresses in the first block of memory in the second task prior to submitting it for processing at the second processing element 204b. In this case, filter units 400a and 400b need not be present.

In the event that the processing of the first and second tasks is completed, and no fault signals have been raised in response to any of the intermediate or final outputs (e.g. all of the respective intermediate and final outputs match), then the final processed output of either the first task or the second task may be taken as the processed output of the input task.

As shown in FIG. 4, the first and second tasks are processed by the first processing element and the second processing element, which are different processing elements. It is also to be understood that, in other examples in accordance with the principles described herein, the first and second tasks may be processed by the same processing element, e.g. at different times. That is, the first and second tasks may be submitted for processing by the same processing element. In a first pass, the processing element may process the first task. A check unit associated with the processing element may form signatures for outputs generated during the processing of the first task, and store those signatures. In a second pass, the processing element may process the second task. The check unit may form signatures for outputs generated during the processing of the second task, and compare them to the respective stored signatures formed for the first task. A filter unit associated with the processing element may be able to determine whether the processing element is performing the first pass or the second pass—and update references to memory addresses configured to store read-write data in the intermediate outputs generated during the processing of the second task. For example, a configuration bit in a register associated with the processing element may be used to indicate whether that processing element is performing the first pass (e.g. binary "0") or the second pass (e.g. binary "1").

In another example, the data processing system shown in FIG. 4 may additionally comprise a third processing element, a third check unit, a third filter unit and a third L0 cache. The task duplication unit 404 (e.g. implemented at driver 309 in FIG. 3) may duplicate the input task so as to additionally form a third task. The memory allocation unit 406 may allocate memory additionally comprising a fourth block of memory configured to store a copy of the read-write data to be accessed during the processing of the third task. The principles described herein can be applied to the processing of that third task at the third processing element. In this example, an output for the processing of the input task can be given even when one of the first, second and third processing elements experiences a fault. That is, the output for the input task may be given as the outputs of the two processing elements that match, whilst the other of the processing elements that provided a non-matching output can be deemed to have faulted.

In yet another example, the allocated memory to be accessed during the processing of the first and second tasks may further comprise a fourth block of memory configured to store write-only data generated during the processing of the first task and a fifth block of memory configured to store the corresponding write-only data generated during the processing of the second task. Alternatively, the allocated memory to be accessed during the processing of the first and second tasks may further comprise a fourth block of memory configured to store write-only data generated during the processing of the first task only. In this example, the filter unit 400b may be configured to filter out (e.g. prevent) the writing of write-only data by the second processing element processing the second (e.g. "safety" or "redundant" task) so as to reduce the latency associated with processing the second task and/or save bandwidth. In this example, the final output generated during the processing of the first task may be used as the output for the processing of the input task (assuming that no fault signals have been raised during the processing of the first and second tasks).

The data processing system of FIGS. 2 to 4 are shown as comprising a number of functional blocks. This is schematic only and is not intended to define a strict division between different logic elements of such entities. Each functional block may be provided in any suitable manner. It is to be understood that intermediate values described herein as being formed by a data processing system need not be physically generated by the data processing system at any point and may merely represent logical values which conveniently describe the processing performed by the data processing system between its input and output.

The data processing systems described herein may be embodied in hardware on an integrated circuit. The data processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a data processing system configured to perform any of the methods described herein, or to manufacture a data processing system comprising any apparatus described herein. An integrated circuit definition dataset may be, for example, an integrated circuit description.

Therefore, there may be provided a method of manufacturing, at an integrated circuit manufacturing system, a data processing system as described herein. Furthermore, there may be provided an integrated circuit definition dataset that, when processed in an integrated circuit manufacturing system, causes the method of manufacturing a data processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a data processing system will now be described with respect to FIG. 8.

Figure 8:
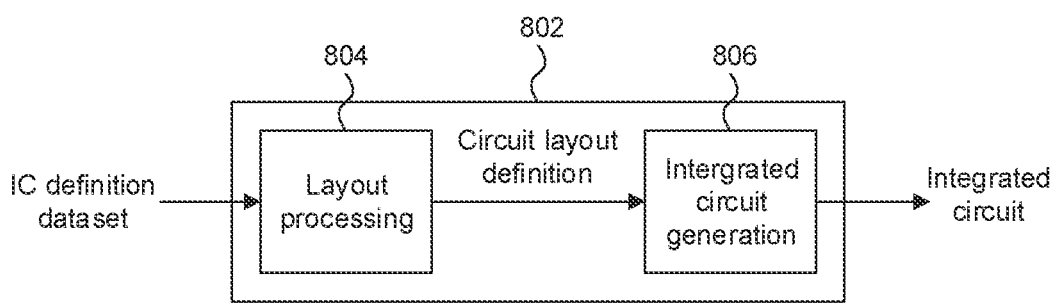
FIG. 8 shows an integrated circuit manufacturing system for generating an integrated circuit embodying a data processing system.

FIG. 8 shows an example of an integrated circuit (IC) manufacturing system 802 which is configured to manufacture a data processing system as described in any of the examples herein. In particular, the IC manufacturing system 802 comprises a layout processing system 804 and an integrated circuit generation system 806. The IC manufacturing system 802 is configured to receive an IC definition dataset (e.g. defining a data processing system as described in any of the examples herein), process the IC definition dataset, and generate an IC according to the IC definition dataset (e.g. which embodies a data processing system as described in any of the examples herein). The processing of the IC definition dataset configures the IC manufacturing system 802 to manufacture an integrated circuit embodying a data processing system as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a data processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a data processing system as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of processing an input task in a processing system, the method comprising:
   duplicating the input task so as to form a first task and a second task;
   allocating memory comprising:
      a first block of memory configured to store read-write data to be accessed during the processing of the first task;
      a second block of memory configured to store a copy of the read-write data to be accessed during the processing of the second task; and
      a third block of memory configured to store read-only data to be accessed during the processing of both the first task and the second task; and
   processing the first task and the second task at processing logic of the processing system so as to, respectively, generate first and second outputs.

2. The method of claim 1, the method further comprising, prior to processing the first and second task, storing read-write data at a memory address of the first block of memory and storing a copy of that read-write data at a corresponding memory address of the second block of memory.

3. The method of claim 1, wherein the first block of memory and the second block of memory are allocated in a heap of memory, each memory address of the second block of memory being offset from a corresponding memory address in the first block of memory by a fixed memory address stride.

4. The method of claim 3, wherein a plurality of input tasks are processed at the processing system and the fixed memory address stride is the same for each pair of first and second tasks formed from the respective input tasks.

5. The method of claim 3, wherein the fixed memory address stride is half the size of the heap of memory.

6. The method of claim 3, wherein the heap of memory is a contiguous block of memory reserved for storing data for the processing of one or more input tasks at the processing system, the heap of memory being in a memory of the processing system.

7. The method of claim 1, the method further comprising:
receiving the second output;
identifying, in the second output, a reference to a memory address in the first block of memory;
updating that reference; and
accessing, using the updated reference, the corresponding memory address in the second block of memory.

8. The method of claim 7, wherein the first block of memory and the second block of memory are allocated in a heap of memory, each memory address of the second block of memory being offset from a corresponding memory address in the first block of memory by a fixed memory address stride, the method further comprising using the fixed memory address stride to update the reference, in the second output, to a memory address in the first block of memory.

9. The method of claim 7, the method further comprising:
receiving an output and identifying that it was received from the second task so as to identify that output as the second output.

10. The method of claim 1, the method further comprising:
submitting, concurrently, the first task and the second task to the processing logic.

11. The method of claim 10, the method further comprising:
fetching data from the first, second and third blocks of memory into a cache configured to be accessed by the processing logic during the processing of the first task and the second task.

12. The method of claim 1, wherein the input task is a safety task which is to be processed according to a predefined safety level.

13. The method of claim 1, wherein the processing logic comprises a first processing element and a second processing element, wherein said processing the first task and the second task at processing logic of the processing system comprises processing the first task at the first processing element and processing the second task at the second processing element.

14. The method of claim 13, wherein the input task is a test task comprising a predefined set of instructions for execution on the processing logic, the predefined set of instructions being configured to perform a predetermined set of operations on the processing logic when executed for predefined input data, and the method further comprising receiving the test task at a processing unit comprising the first processing element and the second processing element.

15. The method of claim 1, wherein the processing logic comprises a particular processing element, wherein said processing the first task and the second task at processing logic of the processing system comprises processing the first task at the particular processing element and processing the second task at the particular processing element.

16. The method of claim 1, wherein the first and second outputs comprise intermediate outputs generated during the processing of, respectively, the first and second tasks, and optionally wherein an intermediate output is one or more of a load, store or atomic instruction generated during the processing of a task.

17. The method of claim 1, the method further comprising:
forming first and second signatures which are characteristic of, respectively, the first and second outputs;
comparing the first and second signatures; and
raising a fault signal if the first and second signatures do not match.

18. The method of claim 17, the method further comprising forming the first and second signatures prior to the first and second outputs accessing a memory hierarchy of the processing system.

19. A processing system configured to process an input task, the processing system embodied in hardware on an integrated circuit comprising: a task duplication unit configured to duplicate the input task so as to form a first task and a second task; a memory; a memory allocation unit configured to allocate blocks of memory in the memory, including: a first block of memory in the memory configured to store read-write data to be accessed during the processing of the first task, a second block of memory in the memory configured to store a copy of the read-write data to be accessed during the processing of the second task, and a third block of memory in the memory configured to store read-only data to be accessed during the processing of both the first task and the second task; and processing logic configured to process the first task so as to generate a first output, and to process the second task so as to generate a second output.

20. The processing system of claim 19, wherein the memory comprises a heap of memory which comprises the first block of memory, the second block of memory and the third block of memory.

21. A non-transitory computer readable storage medium having stored thereon a computer readable dataset description of an integrated circuit that, when processed in an integrated circuit manufacturing system, causes the integrated circuit manufacturing system to manufacture a processing system configured to process an input task, the processing system comprising:
a task duplication unit configured to duplicate the input task so as to form a first task and a second task;
a memory allocation unit configured to allocate memory, including:
a first block of memory configured to store read-write data to be accessed during the processing of the first task,
a second block of memory configured to store a copy of the read-write data to be accessed during the processing of the second task, and
a third block of memory configured to store read-only data to be accessed during the processing of both the first task and the second task;

processing logic configured to process the first task so as to generate a first output, and to process the second task so as to generate a second output.

\* \* \* \* \*